United States Patent
O'Sullivan et al.

(10) Patent No.: US 9,251,522 B2
(45) Date of Patent: Feb. 2, 2016

(54) PIXEL CLUSTER TRANSIT MONITORING FOR DETECTING CLICK FRAUD

(75) Inventors: Patrick O'Sullivan, Ballsbridge (IE);
Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 2720 days.

(21) Appl. No.: 11/766,965

(22) Filed: Jun. 22, 2007

(65) Prior Publication Data

US 2008/0320125 A1 Dec. 25, 2008

(51) Int. Cl.
G06F 15/173 (2006.01)
G06Q 30/00 (2012.01)
G06Q 30/02 (2012.01)

(52) U.S. Cl.
CPC ............ G06Q 30/02 (2013.01); G06Q 30/0225 (2013.01); G06Q 30/0241 (2013.01); G06Q 30/0248 (2013.01)

(58) Field of Classification Search
CPC .............. G06Q 30/02; G06Q 30/0241; G06Q 30/0248; G06Q 30/0225
USPC .................. 709/224; 705/14.47, 14.68, 14.73
See application file for complete search history.

(56) References Cited

U.S. PATENT DOCUMENTS

| | | | | |
|---|---|---|---|---|
| 5,596,347 A * | 1/1997 | Robertson et al. | ............ | 715/856 |
| 5,598,183 A * | 1/1997 | Robertson et al. | ............ | 715/856 |
| 5,646,647 A * | 7/1997 | Chow | ............ | 715/856 |
| 5,740,549 A * | 4/1998 | Reilly et al. | ............ | 705/14.42 |
| 5,920,304 A * | 7/1999 | Berstis | ............ | 715/861 |
| 6,219,028 B1 * | 4/2001 | Simonson | ............ | 715/862 |
| 6,393,407 B1 * | 5/2002 | Middleton, III et al. | ... | 705/14.73 |
| 6,677,966 B2 * | 1/2004 | Thorgeirsson | ............ | 715/810 |
| 6,784,869 B1 * | 8/2004 | Clark et al. | ............ | 345/156 |
| 6,877,007 B1 * | 4/2005 | Hentzel et al. | ............ | 709/224 |
| 6,993,707 B2 * | 1/2006 | Baker et al. | ............ | 715/241 |
| 7,028,001 B1 * | 4/2006 | Muthuswamy et al. | ... | 705/14.73 |
| 7,305,452 B2 * | 12/2007 | Sakatani | ............ | 709/217 |
| 7,657,626 B1 * | 2/2010 | Zwicky | ............ | 709/224 |
| 8,028,233 B1 * | 9/2011 | Florschuetz et al. | ............ | 715/716 |
| 2001/0013906 A1 * | 8/2001 | Thorgeirsson | ............ | 348/569 |
| 2001/0016858 A1 * | 8/2001 | Bates et al. | ............ | 707/513 |
| 2002/0075321 A1 * | 6/2002 | Sakatani | ............ | 345/814 |
| 2002/0075332 A1 * | 6/2002 | Geilfuss et al. | ............ | 345/859 |
| 2002/0109645 A1 * | 8/2002 | Hendrick | ............ | 345/1.1 |
| 2002/0111865 A1 * | 8/2002 | Middleton, III et al. | ........ | 705/14 |
| 2003/0074416 A1 * | 4/2003 | Bates et al. | ............ | 709/217 |
| 2005/0034063 A1 * | 2/2005 | Baker et al. | ............ | 715/513 |
| 2005/0091111 A1 * | 4/2005 | Green et al. | ............ | 705/14 |

(Continued)

*Primary Examiner* — Daniel C Murray

(74) *Attorney, Agent, or Firm* — Moore & Van Allen PLLC

(57) ABSTRACT

Detecting click fraud that includes a client device capable of accessing a server hosting a web page containing an advertisement. The client device includes a network interface allowing access to the server and code on the client device. The code accesses and displays a web page containing an advertisement, provides mechanisms (e.g., an applet, an ActiveX control, a plugin, a JavaScript, a browser scripting language, browser extensions, or code native to the browser) associated with each pixel cluster where each mechanism captures information regarding the transit of the pixel cluster by a cursor on the web page, and collects information based on the capturing by each associated mechanism regarding the transit of the pixel cluster by a cursor on the web page.

23 Claims, 7 Drawing Sheets

(56) References Cited

U.S. PATENT DOCUMENTS

| | | | |
|---|---|---|---|
| 2006/0136294 A1* | 6/2006 | Linden et al. | 705/14 |
| 2006/0287105 A1* | 12/2006 | Willis | 463/42 |
| 2008/0021773 A1* | 1/2008 | Lee et al. | 705/14 |
| 2008/0201214 A1* | 8/2008 | Aaron et al. | 705/14 |
| 2008/0270154 A1* | 10/2008 | Klots et al. | 705/1 |
| 2008/0279349 A1* | 11/2008 | Jaffe et al. | 379/88.14 |
| 2008/0281685 A1* | 11/2008 | Jaffe et al. | 705/14 |
| 2009/0006214 A1* | 1/2009 | Lerman et al. | 705/14 |
| 2011/0247065 A1* | 10/2011 | Melnyk | 726/16 |

\* cited by examiner

PIXEL CLUSTER TRANSIT MONITORING FOR DETECTING CLICK FRAUD

BACKGROUND OF THE INVENTION

The present invention is related to detecting click fraud, and specifically to pixel cluster transit monitoring for detecting click fraud.

Pay Per Click (PPC) is a market tool of the Internet and drives businesses such as Google and Yahoo. In the PPC model, an Advertiser creates clickable advertisements which a Publisher (typically an unaffiliated web site) displays on their website. The Advertiser pays the Publisher for each "click through" which a visitor to the Publisher's site generates, in essence paying for each referral. A PPC system is often extended to include Advertising Networks (e.g., Google) that coordinate the distribution of these advertisements, charging the Advertisers and paying the Publishers, acting essentially as middlemen and making a profit based on the difference between what they pay the Publishers versus what they charge the Advertisers.

Click Fraud (CF) occurs when a person or organization repeatedly generates clicks to a PPC advertisement with the intent of generating an improper charge to the Advertiser. There are several parties who may have an economic motivation to commit Click Fraud.

Click Fraud is unethical and is illegal in several jurisdictions. Click Fraud may be accomplished via automated scripts (clickbots) which run in distributed networks, often using zombie machines (end-user machines compromised by viruses) to simulate clicks from legitimate users. Estimates are that fraudulent clicks represent 2-20% of all clicks.

BRIEF SUMMARY OF THE INVENTION

According to one aspect of the present invention, a method for detecting click fraud includes providing an advertisement on a web page, providing pixel clusters on the web page with the advertisement, each pixel cluster having an associated mechanism for capturing information regarding the transit of the pixel cluster by a cursor on the web page; and collecting information based on the capturing of information by each associated mechanism, regarding the transit of the pixel cluster by a cursor on the web page.

According to another aspect of the present invention, a server hosts a web page containing an advertisement. The server may include an input interface capable of receiving advertisement information related to the advertisement, a storage device capable of storing the received advertisement information, and a processing device. The processing device may control providing the advertisement on the web page, providing pixel clusters on the web page with the advertisement, each pixel cluster having an associated mechanism for capturing information regarding the transit of the pixel cluster by a cursor on the web page, and collecting information based on the capturing by each associated mechanism information regarding the transit of the pixel cluster by the cursor on the web page According to yet another aspect of the present invention, a computer program product may include a computer useable medium having a computer useable program code embodied therewith, the computer useable program code including computer useable program code configured to provide an advertisement on a web page, computer useable program code configured to provide pixel clusters on the web page with the advertisement, each pixel cluster having an associated mechanism for capturing information regarding the transit of the pixel cluster by a cursor on the web page, and computer useable program code configured to collect information based on the capturing by each associated mechanism of the information regarding the transit of the pixel cluster by a cursor on the web page.

According to another aspect of the present invention, a method for detecting click fraud may include accessing a web page containing an advertisement; providing at least one mechanism associated with at least one pixel cluster on the web page, each said mechanism capturing information regarding the transit of the pixel cluster by a cursor on the web page, and collecting information based on the capturing by each associated mechanism of information regarding the transit of the pixel cluster by a cursor on the web page According to yet another aspect of the present invention, a device accesses a server hosting a web page containing an advertisement and includes: a network interface, the network interface allowing access to the server, and client code. The client code may perform displaying the web page with the advertisement, providing mechanisms associated with each pixel cluster for capturing information regarding the transit of the pixel cluster by a cursor on the web page, and collecting information based on the capturing by each associated mechanism information regarding the transit of the pixel cluster by a cursor on the web page.

According to another aspect of the present invention, a computer program product comprises a computer useable medium having computer useable program code embodied therewith, the computer useable program code including computer useable program code configured to access a web page containing an advertisement, computer useable program code configured to provide mechanisms associated with each pixel cluster, each mechanism capturing information regarding the transit of the pixel cluster by a cursor on the web page, and computer useable program code configured to collect information based on the capturing by each associated mechanism of information regarding the transit of the pixel cluster by a cursor on the web page.

According to yet another aspect of the present invention, a method for detecting click fraud includes: receiving data related to a cursor movement towards an advertisement displayed on a web page, analyzing the cursor movement data, and determining a confidence level useable in the determination of click fraud, said confidence level responsive to the analysis of the cursor movement.

According to another aspect of the present invention, a processing device includes: an input interface receiving data related to a cursor movement towards an advertisement displayed on a web page; and a processor. The processor performing analyzing the cursor movement data and determining a confidence level useable in the determination of click fraud, said confidence level responsive to the analysis of the cursor movement.

According to yet another aspect of the present invention, a computer program product comprises a computer useable medium having computer useable program code embodied therewith, the computer useable program code including computer useable program code configured to receive data related to a cursor movement towards an advertisement displayed on a web page, computer useable program code configured to analyze the cursor movement data, and computer useable program code configured to determine a confidence level useable in the determination of click fraud, said confidence level responsive to the analysis of the cursor movement.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
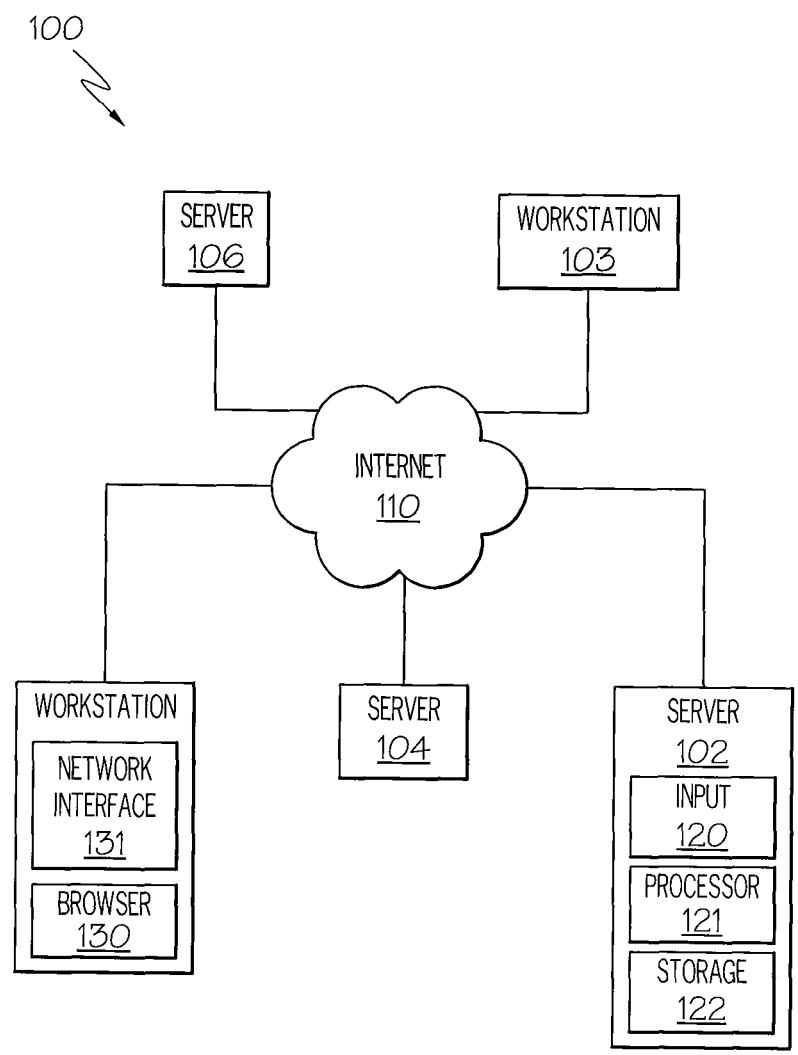
FIG. 1 is a diagram of a system for pixel cluster transit monitoring according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

Embodiments according to the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks. Alternatively, computer program implemented actions may be combined with operator or human implemented actions in order to carry out an embodiment of the invention.

Embodiments according to the present invention guard against click fraud by validating that prior to clicking on an advertisement (ad) a cursor has moved from its initial position when the page was loaded, to the ad and in fact transited at least one pixel cluster on the way to the ad. Further, by timing the duration of the web page view, from the time it was initially loaded to the time of the clicking on an advertisement, a confidence measure is obtained that the sequence of web page view, transit, and click was in fact reasonable (e.g., human-like). Using automated mechanisms, software, or a combination thereof, entities committing click fraud may determine the location of an advertisement, position the cursor over the advertisement, and then initiate a click on the advertisement. Thus, by automatically pre-positioning the cursor directly over the advertisement, the cursor will not have been moved from a source location across a pixel cluster boundary to the advertisement. A click fraud is therefore detected since a human action (e.g., controlling the cursor with a pointing device) would not be able to get the cursor over the advertisement without crossing a pixel cluster boundary near the advertisement.

In embodiments according to the present invention, applets may be provided along with the web page containing the click target (i.e., the ad which is to be click fraud protected). These applets are associated with pixel clusters that may form a perimeter around a click target or be distributed at various places on the web page. For example, a rectangular ad click target may be associated with four applets, each comprising a segment of a perimeter of the click target. The applets capture cursor movement (e.g., a mouse movement) over the associated pixel clusters and may transmit this information to an entity which will determine whether click fraud has been committed. This entity may be the server that has served/provided the web page, a client device, or any other processing device. Further, a timer associated with one of the applets (or a fifth applet or other method) may measure how long the web page has been viewed. This information is also sent to the entity that will determine whether click fraud has been committed. The data received by this entity, e.g., when the click occurs, the transit and the timer information, are used by the entity to create a confidence factor that the click is valid and non-fraudulent.

The server providing the web page with the advertisement and the client device displaying the web page with the advertisement may have one or more of three distinct modules, which may be co-located in many situations or separated, but are logically distinct. For example, a first module may take a web page with advertisements in it and insert the pixel clusters. A second module may capture the cursor movements of the user leading up to the mouse click and note whether a pixel cluster was crossed and may also time the duration of the web page view. Further, a third module may take the web page view time, the click information, and the transit information and judge whether a click fraud has occurred.

Instances where the mouse click occurred very quickly and without crossing a pixel cluster would be judged to be click fraud with a high confidence level. Those that crossed the pixel cluster and took a longer period of time would be judged not to be click fraud. A database of surveyed cursor movement data from human users can be used to adjust the threshold values. There is inherently a tradeoff between increasing the detection rate of actual click fraud detection and decreasing the rate of false alarms. Referencing the database of known cursor movement timing data can allow the operator to adjust the sensitivity of the detection algorithm to optimize it to their preferences.

It should be noted that "applets" are referred to as single example to illustrate how features of embodiments according to the present invention can be added to a web page. Other mechanisms that may be used to detect cursor movement across a pixel cluster may include but are not limited to ActiveX controls, plugins, JavaScript and other browser scripting languages, as well as browser extensions and code native to the browser, combined with markup changes to the downloaded web page to indicate the use of these features. Any mechanism used to detect cursor movement across a pixel cluster is within the scope of embodiments of the present invention.

Moreover, in embodiments of the present invention, when a web page (e.g., a search results page) comes up with information and advertisements, the cursor may be moved to a non-default location, by use of predefined location lists, or pseudo-random generated locations. For example, currently with a popular search engine, a person can click on "Search" and get the resulting info and the ads displayed on the web page. Therefore, a clickbot with a predefined trajectory of cursor movement could simulate this. If the cursor is moved to a non-default location using the above means it would have to be located and then moved. Human characteristics of such a movement could be stored and compared making fraud more difficult. The pixel detection clusters can then be strategically located at various places on the page and not just near the ads.

People committing fraud may use a recording tool to record a set of human interactions which they play repetitively. Various testing tools such as those by IBM Rational have the ability to record and automatically replay human interactions as part of forming a test bucket, for automated testing. According to embodiments of the present invention, an applet associated with the search page (or other method), could calculate a signature, including timing, trajectory, and the like. These signatures could be recorded and matched. As human behavior is not 100% the same each time, the perfection of reproduction would be detected as possible fraudulent activity.

FIG. 1 shows a diagram of a system for pixel cluster transit monitoring according to an example embodiment of the present invention. This system 100 may include one or more workstations 101, 103 and one or more servers 102, 104, 106 where each may be connected to a network 110, for example, the Internet. Each workstation includes a browser 130 that provides the capability to access a web page and prepare the web page for display on a screen, and a network interface 131 providing connection to the network 110 for accessing the web page. Although not shown, the workstations 101, 103 may also include a processor, memory, one or more data input devices such as a keyboard and/or a pointing device such as a mouse, a display. Each server 102, 104, 106 may include one or more processors 121, one or more storage devices 122, and one or more input interface 120. Further, although not shown, the servers 102, 104, 106 may include a display, a network interface, and other items normally associated with a server. The processors may control activities as well as perform various types of processing. The input interface may be a device that receives data, receives keystrokes, receives portable storage devices, be a pointing device, or any other type device that provides input to the server. In addition, the workstations 101, 103 and the servers 102, 104, 106 may each be capable of receiving software instructions stored on a storage medium, (e.g., a compact disk (CD), diskette, tape, etc.), that may be inserted into the workstations 101, 103 and/or the servers 102, 104, 106. Each workstation 101, 103 and each server 102, 104, 106 may have the same cursor cluster transit processing capability. However, to illustrate the present invention, one workstation 101 and one server 102 will be discussed.

A company, publisher or other entity that manages a server 102 may host a website on the server 102 where the website provides content as well as advertisements for advertisers that pay the publisher to include clickable advertisements on the website of the publisher. The advertiser may pay the publisher for each "click through" which a visitor to the publisher's site (hosted by the server 102), generates. A visitor or user may access the website hosted by the server 102 via the network 110 using a workstation 101 or other computing type device. The workstation 101 may access the website hosted on the server 102 via a network 110 such as the Internet.

The server 102 generates and downloads the web page which may include markup that enables the cursor tracking, the web page viewing duration timing, and the pixel clusters. In the case of downloaded code (e.g., applets, activeX, Javascript, etc.) the server 102 may also serve this code for initial download. The actual timing, click detection, and pixel transiting processing may all be done in software code on the workstation 101 (i.e., client device), whether downloaded from the server 102, natively built into the browser installed on the client device 101, or other client device software.

Moreover, the signature information for the clicks, the timings, and the transit info, may be sent from the workstation/client device 101 to a server 102, 104, 106 that will analyze this information and determine a confidence factor as to whether the cursor movement is indicative of click fraud. The server 104, 106 or processing device performing the analysis may be a different server from the server 102 hosting the web page. This information may be sent via the hosting server 102 as an intermediary or it may be sent directly to the server 104, 106 performing the analysis. In embodiments according to the present invention, the hosting server 102 may be same as the server that judges.

The web pages displayed on the website hosted by the server 102 insert pixel cluster transit monitoring markup or other mechanisms into the web page to prevent click fraud from occurring on advertisements displayed on the website. In this regard, the server 102 monitors the transition of a cursor movement (e.g., representing movements controlled by a pointing device, software, automated mechanisms, etc.) on the web page across a pixel cluster towards an advertisement. Based on the detection of one or more pixel clusters having been transited (i.e., traversed) by a cursor movement, the server determines a confidence factor as to whether the cursor movement is indicative of click fraud, a click fraud is occurring, or whether a clicking on the advertisement (ad) is in fact valid. If valid, a web page or information associated with clicking on the advertisement may be displayed and appropriate charges may be sent to the advertiser based on the clicking of the advertisement.

Figure 2:
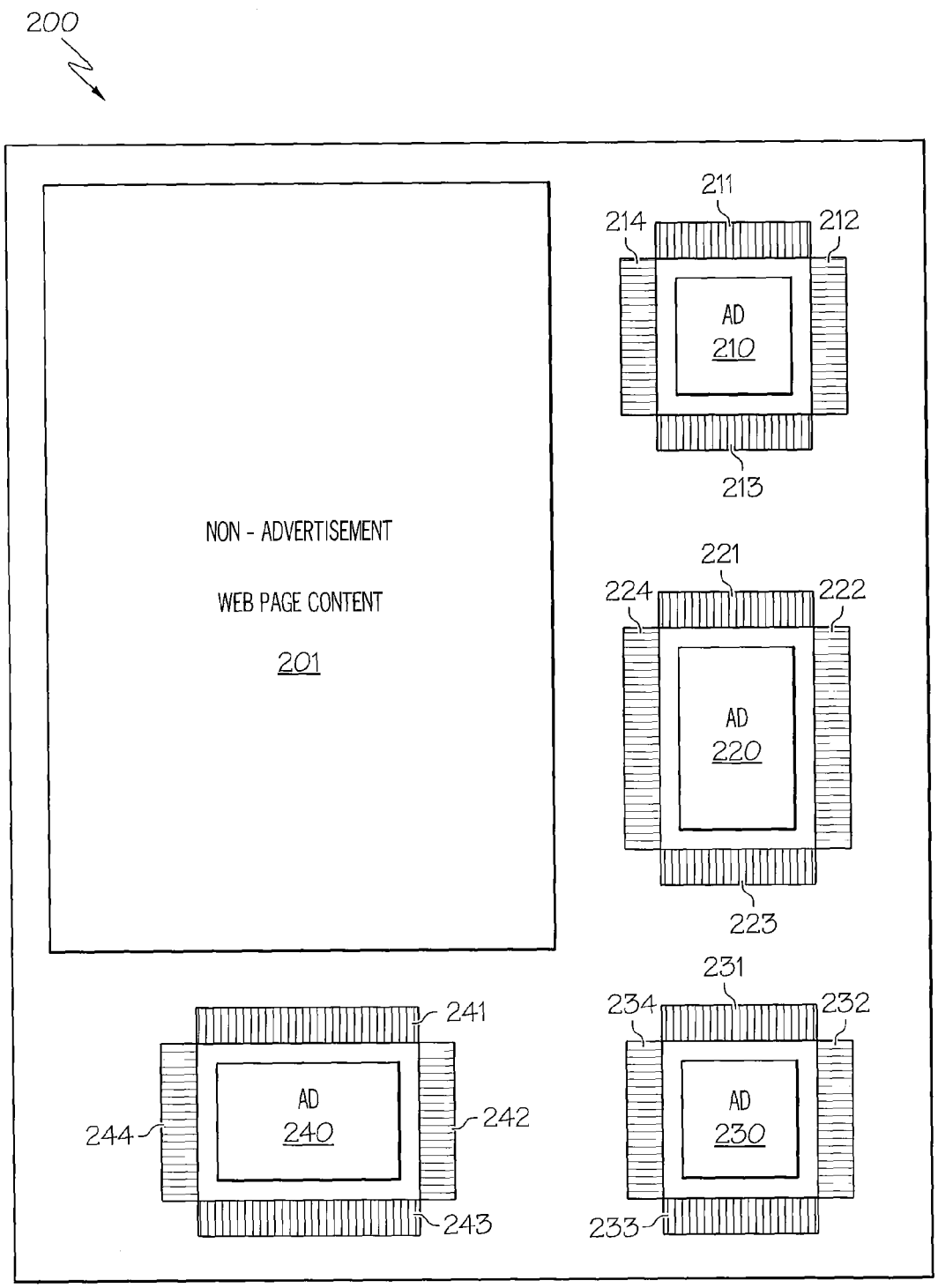
FIG. 2 is a diagram of a web page with pixel clusters surrounding advertisements according to an example embodiment of the present invention.

FIG. 2 shows a diagram of a web page with pixel clusters surrounding advertisements according to an example embodiment of the present invention. In this example embodiment, a web page 200 may include one or more advertisements 210, 220, 230, 240 as well as a non-advertisement area that contains other web page content 201. In this example embodiment, each advertisement 210, 220, 230, 240 may have pixel clusters that form a perimeter around the advertisement. Each pixel cluster may be associated with at least one mechanism used to detect cursor movement across a pixel cluster (e.g., applet, ActiveX controls, plugins, JavaScript and other browser scripting languages, browser extensions and code native to the browser, etc.) that is served along with the web page containing the advertisements. In this example embodiment, the advertisements are each shown to have four sides and each advertisement 210, 220, 230, 240 may be surrounded by four pixel clusters. However, the present invention is not limited to four pixel clusters surrounding an advertisement as there may be as many or as few pixel clusters as desired to form a perimeter around a target advertisement that are sufficient in order to insure that a cursor movement towards the advertisement transits a pixel cluster.

Therefore, in this example embodiment there are four advertisements 210, 220, 230, 240 on the web page 200 where a first advertisement 210 may have four pixel clusters, 211-214 that form a perimeter around the first advertisement 210. A second advertisement 220 may have four pixel clusters 221-224 that form a perimeter around the second advertisement 220. Similarly, a third advertisement 230 may have four pixel clusters 231-234 that form a perimeter around the third advertisement 230, and a fourth advertisement 240 may have four pixel clusters 241-244 that form a perimeter around the fourth advertisement 240. Information regarding cursor movements and when a cursor movement has transited a pixel cluster towards an advertisement 210, 220, 230, 240 may be received by a server 102 that hosts the web page 200, or sent to and received by a client device 101, or any other processing device 103, 104, 106 for processing.

Mechanisms or markup in the web page (e.g., applets) associated with each pixel cluster 211-214, 221-224, 231-234, 241-244 capture the cursor movements over the associated pixels and may transmit this information to an entity for processing. As noted previously, the entity may be the server 102 that has served the web page 200, the client device 101, or any other processing device 103, 104, 106. Using this transit information, along with other information a confidence measure may be obtained regarding whether a click fraud is occurring. For example, a sequence of a time duration that the web page 200 has been viewed, transit, and click may be analyzed to determine a confidence measure that the sequence is in fact reasonable and that no click fraud has occurred. A timer associated with one of the applets may measure how long the web page has been viewed. When the click occurs, the transit and the timer may be used to create a confidence factor that a click fraud has not occurred.

To illustrate the present invention, the pixel clusters 211-214, 221-224, 231-234, 241-244, have been shown in a rectangular shape. However, embodiments of the present invention are not limited by pixel clusters in this shape as pixel clusters may be in any shape and/or size that form a cluster around an advertisement and still be within the scope of the present application. Further, embodiments of the present invention may include pixel clusters that form a perimeter around a specific advertisement where each pixel cluster is of a different shape and/or size.

Figure 3:
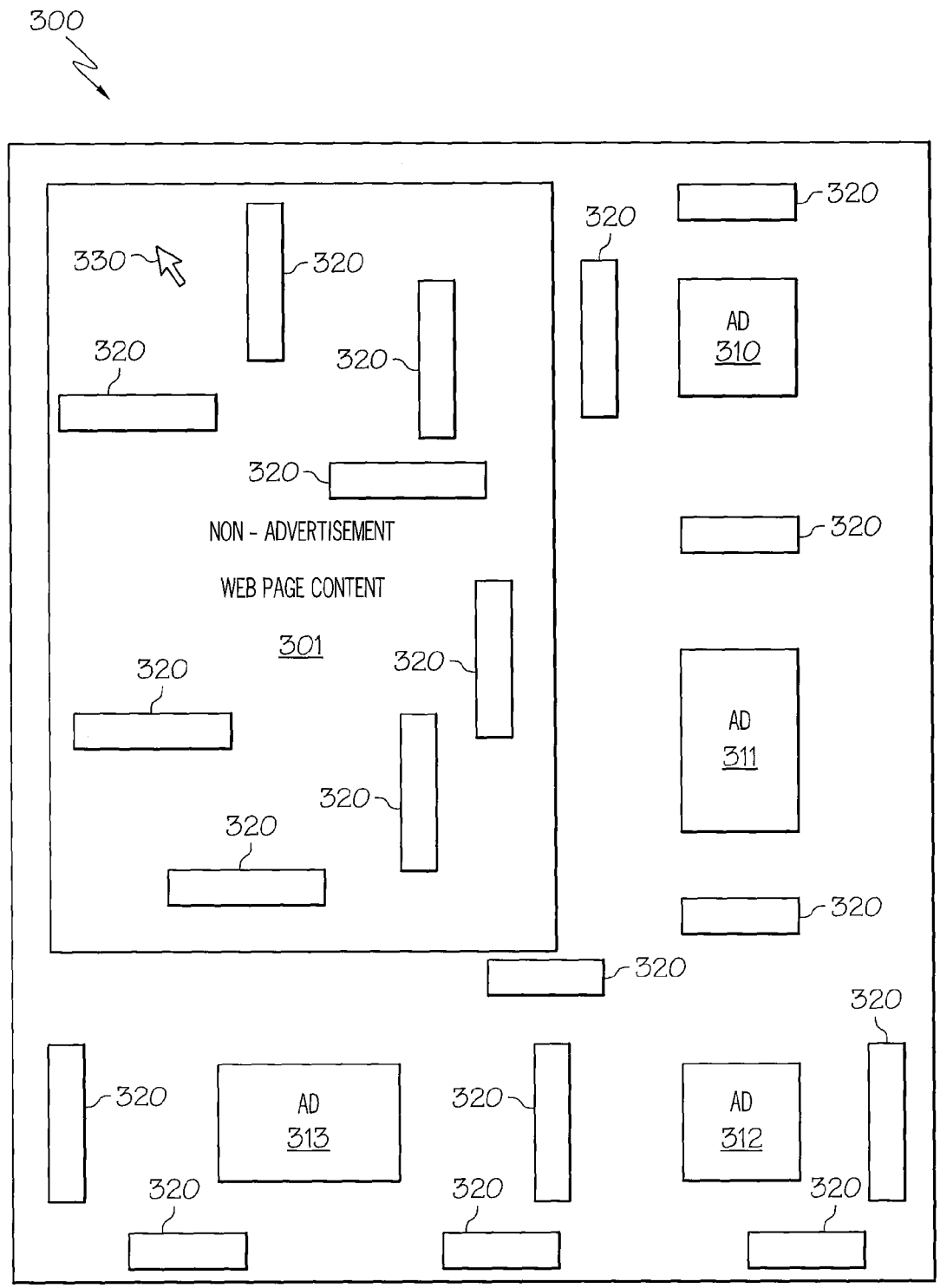
FIG. 3 is a diagram of a web page where pixel clusters are located in various places on the web page according to an example embodiment of the present invention.

FIG. 3 shows a diagram of a web page where pixel clusters are located in various places on the web page according to an example embodiment of the present invention. In this example embodiment, a web page 300 may include an area containing non-advertisement web page content 301 and one or more areas containing advertisements 310-313. Further, a cursor 330 may be displayed at a non-default location each time the web page 300 is displayed. The web page 300 may also include a number of pixel clusters 320 that are located at various places throughout the web page 300 and not just near the advertisements 310-313 on the web page 300. Each pixel cluster 320 may have at least one associated mechanism used to detect cursor movement across a pixel cluster (e.g., applet, ActiveX controls, plugins, JavaScript and other browser scripting languages, browser extensions and code native to the browser, etc.) that is served when the web page 300 is served/displayed.

Figure 4:
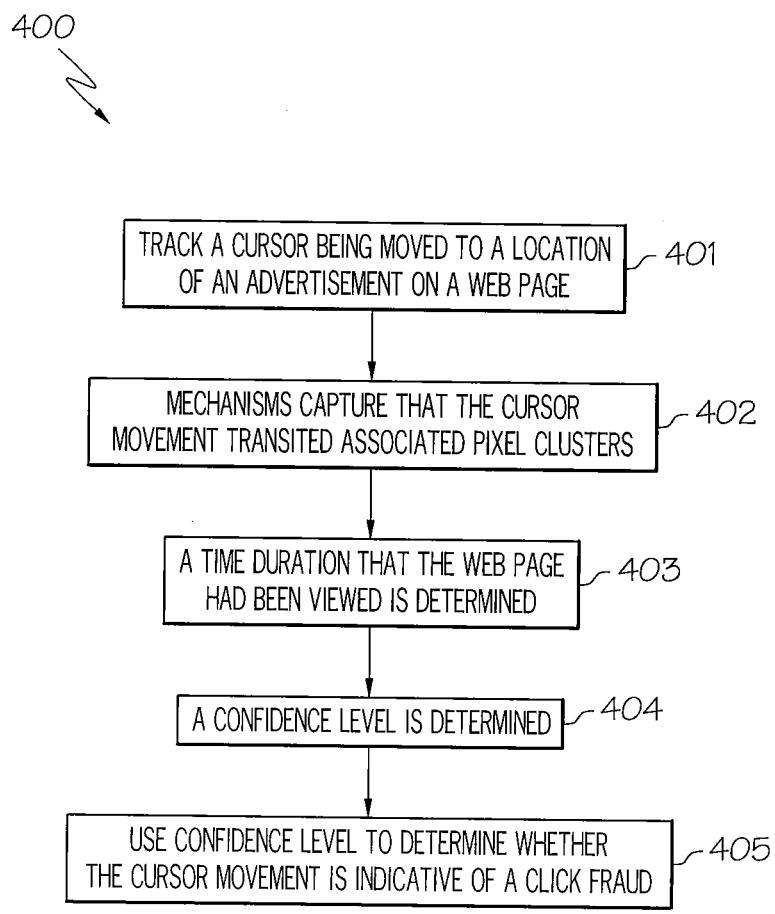
FIG. 4 is a flowchart of a process for pixel cluster transit monitoring for detecting click fraud according to an example embodiment of the present invention.

FIG. 4 shows a flowchart of a process for pixel cluster transit monitoring for detecting click fraud according to an example embodiment of the present invention. The process 400 includes in block 401, tracking a cursor being moved to a location of an advertisement on a web page and a controller of the cursor clicking on the advertisement. In block 402, mechanisms (e.g., applets) associated with pixel clusters on the web page capture that the cursor movement transited the associated pixel clusters before the clicking of the advertisement. In optional block 403, a time duration that the web page has been viewed up to the clicking of the advertisement may be determined. In block 404, a confidence level is determined based on the time duration, the transiting and the clicking. In block 405, the confidence level may be used to determine whether the cursor movement is indicative of a click fraud.

Instances where the mouse click occurred very quickly and without crossing a pixel cluster would be judged to be click fraud with a high confidence level. Those that crossed the pixel cluster and took a longer period of time would be judged not to be click fraud. A database of surveyed cursor movement data from human users can be used to adjust the threshold values. There is inherently a tradeoff between increasing the detection rate of actual click fraud detection and decreasing the rate of false alarms. Referencing a database of known cursor movement timing data can allow the adjustment of the sensitivity of the detection algorithm to optimize it to desired preferences.

According to embodiments of the present invention, pixel clusters may be inserted onto a web page displaying advertisements by a server of a publisher that is hosting the web site or at a client device by client code (e.g., browser code) installed on the client device. As noted previously, the pixel clusters on the web page monitor cursor movements across the pixel clusters. Mechanisms (e.g., applets, software, or any other means) associated with the pixel clusters may collect data from pixel clusters transited by the cursor and forward the collected data to be processed to determine if a click fraud has been attempted. The processing of the collected data from the pixel clusters may be processed by any processor and still be within the scope of the present invention. For example, the processing may be performed by the server hosting the web page with the advertisement or by the client device that is displaying the web page with the advertisement. Moreover, the processing may be performed by another entity outside of the server or the client device. In this embodiment, some or all of the collected data may be forwarded from the server or client device to the outside entity for processing. The outside entity may analyze the collected data, determine if a click fraud is occurring, and forward the result of the analysis back to the server or client device. The server or client device may then take appropriate action based on the analysis. The outside entity may be a server or a client device.

Figure 5:
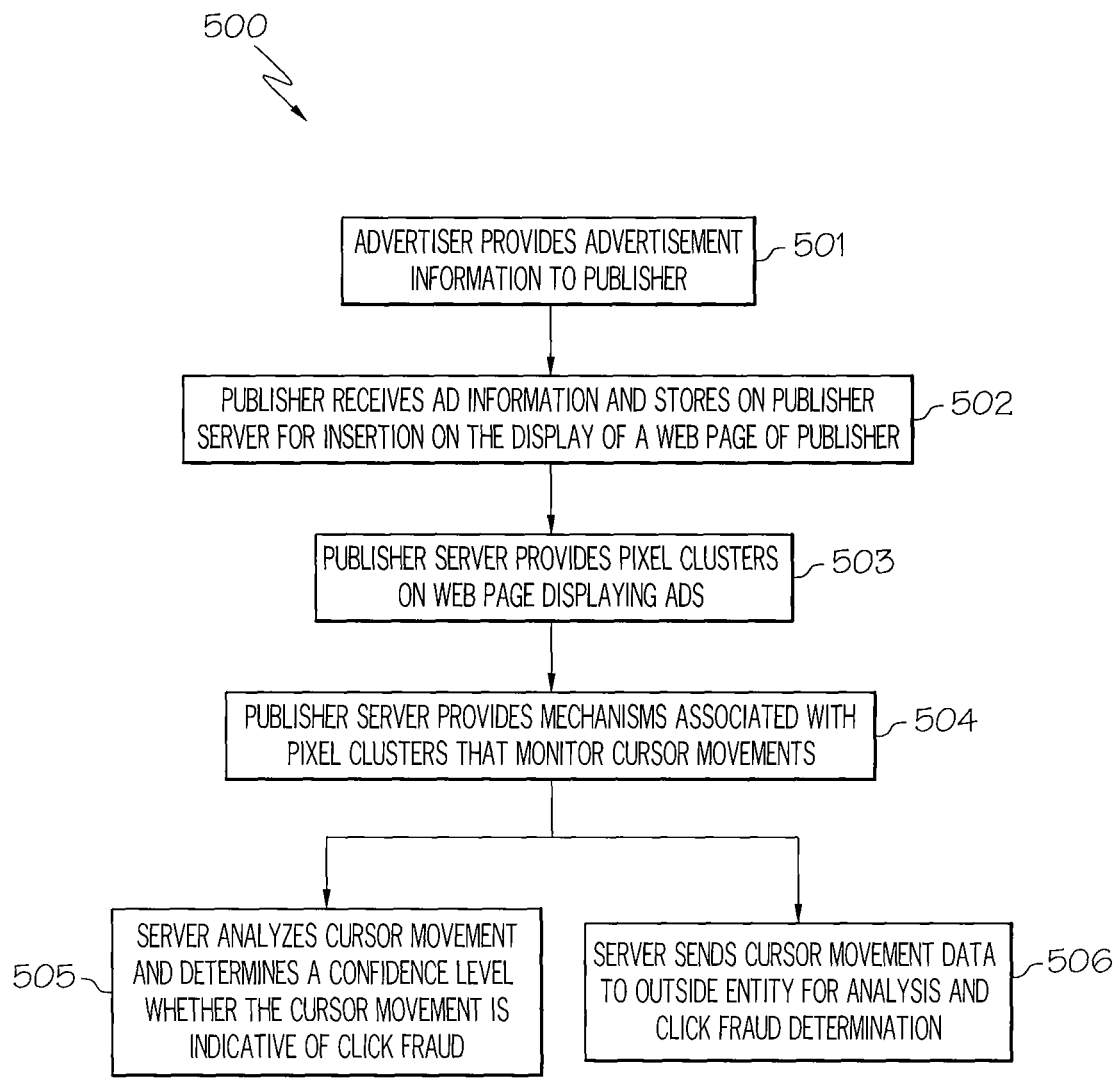
FIG. 5 is a flowchart of a process for displaying pixel clusters by a server according to an example embodiment of the present invention.

FIG. 5 shows a flowchart of a process for displaying pixel clusters by a server according to an example embodiment of the present invention. The process 500 includes in block 501, an advertiser may provide advertisement information to a publisher. In block 502, the publisher receives the advertisement information and stores the advertisement information on a publisher server for insertion onto the display of a web page of the publisher. In block 503, the publisher server may provide pixel clusters on the web page displaying the advertisement. These pixel clusters may be served along with the webpage each time the advertisement on the web page is served. In block 504, mechanisms (e.g., applets, ActiveX controls, plugins, JavaScript and other browser scripting languages, browser extensions and code native to the browser, etc.) associated with the pixel clusters may collect data from pixel clusters transited by cursor movements on the web page. These mechanisms may be served along with the webpage by the server each time the web page is served. In block 505, the server may analyze the cursor movement and determine a confidence level as to whether the cursor movement is indicative of click fraud, or alternatively, in block 506, the server may send the cursor movement data to an outside entity for analysis and/or determination of a possible click fraud.

Figure 6:
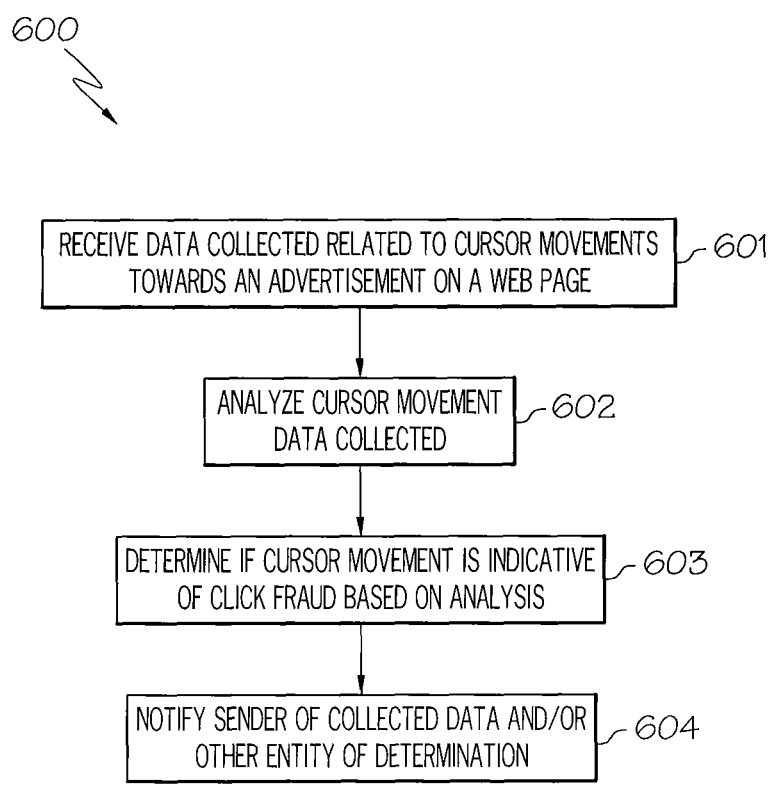
FIG. 6 is a flowchart of a process for processing pixel cluster information according to an example embodiment of the present invention.

FIG. 6 shows a flowchart of a process for processing pixel cluster information according to an example embodiment of the present invention. The process 600 includes in block 601, a processing device (e.g., server, client device, etc.) may receive data collected by monitoring cursor movements that have transited one or more pixel clusters towards and advertisement on a web page. Data received may also include data gathered related to a timing of a view duration of the web page, data related to the transiting, data related to a speed of the cursor transiting each pixel cluster, data related to a click on the advertisement when initially displayed during a short time duration in one of a transparent or an invisible font, or data related to the clicking of the advertisement. The collected data may be received from a server, client device, or any other processing device. In block 602, the processing device may analyze the cursor movement data collected, as well as any other received data. In block 603, the processing device may determine if the cursor movement is indicative of click fraud based on the analysis (as discussed previously). In block 604, the processing device may notify the sender of the collected data (e.g., publisher of the web page with the advertisements, client device viewing the web page, etc.) of the resultant determination. The processing device may notify another entity, not associated with the sending of the collected data, of the determination either along with or without notifying the sender of the collected data.

Figure 7:
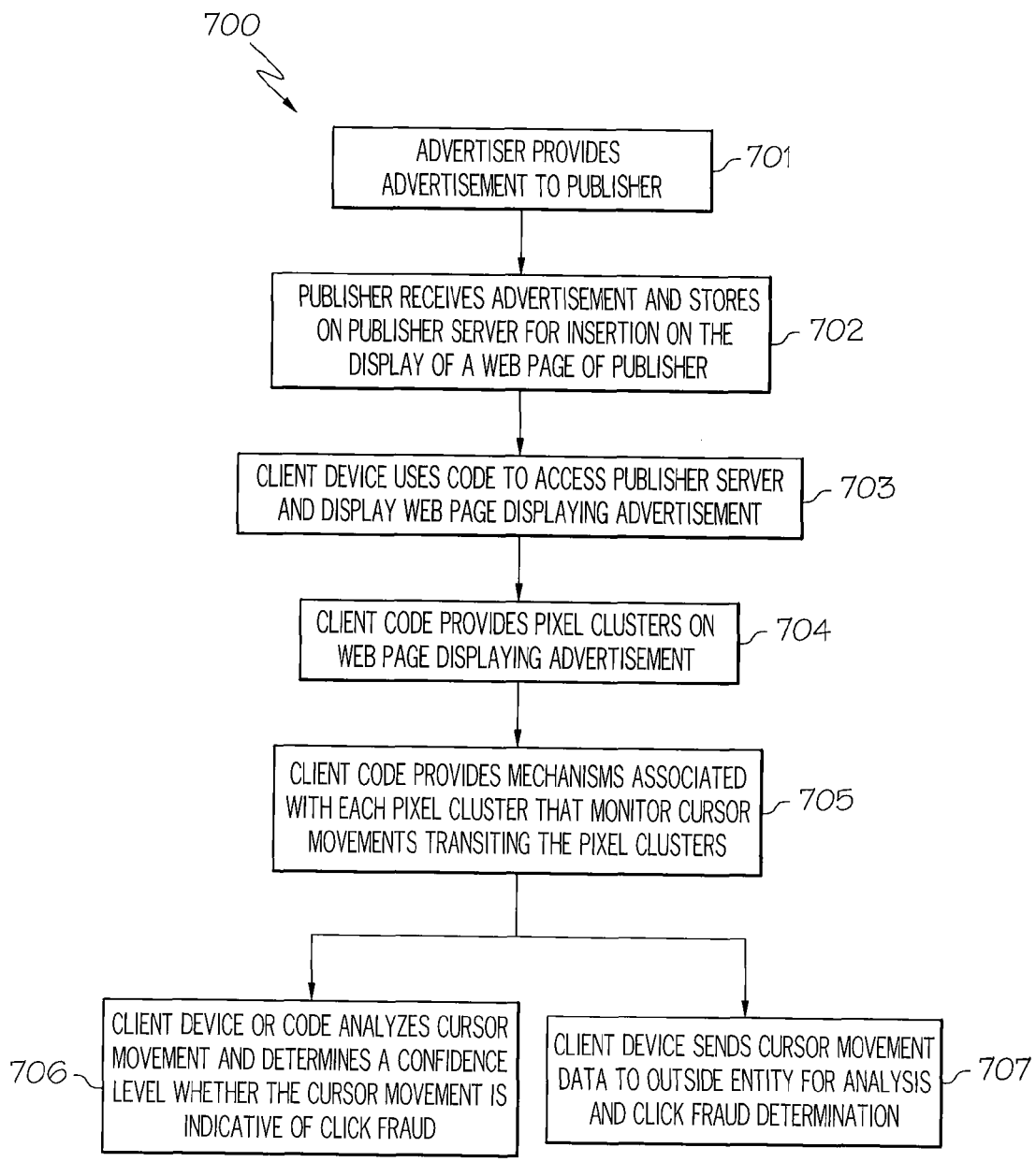
FIG. 7 is a flowchart of a process for displaying pixel clusters by a client device according to an example embodiment of the present invention.

FIG. 7 shows a flowchart of a process for displaying pixel clusters by a client device according to an example embodiment of the present invention. The process 700 includes in block 701, an advertiser provides advertisement information to a publisher. In block 702, a publisher receives the advertisement information and may store this information on a publisher server for insertion of the advertisement onto the display of a web page of the publisher. In block 703, a client device accesses the publisher's server and uses code on the client device to access and display the web page displaying advertisement. The code (client code) on the client device may be code integrated with a client browser, a separate plug in used for the browser, modifications to the operating system, a mouse device driver that works in concert with the browser, etc.

In block 704, the client code provides pixel clusters on the web page displaying the advertisement. In block 705, the client code provides mechanisms associated with each pixel cluster that capture cursor movements that transit the pixel clusters on the web page. The mechanisms may be applets, ActiveX controls, plugins, JavaScript and other browser scripting languages, browser extensions and code native to the browser, etc. The mechanisms may be provided by the browser when the web page with the advertisement is displayed. In block 706, the client device or client code may analyze the cursor movement and determine whether the cursor movement is indicative of click fraud, or alternatively, in block 707, the client device or client code may send the cursor movement data to an outside entity for analysis and/or determination of a possible click fraud.

In some embodiments according to the present invention, the initial presentation of the advertisements (e.g., some fraction of a second) may be displayed in a transparent or invisible font and then later made visible. A click on the ad during the invisible period may also be transmitted as data used to return a confidence level for possible click fraud.

Further, in some embodiments according to the present invention, the perimeter boundary around an ad may be multiple pixels thick and the speed of the cursor transit through the boundary may be measured and factored into the confidence level determination.

In addition in some embodiments according to the present invention, multiple boundary layers may be used. Moreover, in some embodiments according to the present invention, boundary layers may be varied in placement (e.g., an adjacent perimeter, a perimeter several pixels away from the target ad, perimeters at different pixel lengths away from the target ad, varied by segment, etc.). The variation may also be pseudo-random.

Embodiments according to the present invention also allow a server to understand that the incoming client is using speech recognition or other automated mechanisms for manipulating the cursor and keyboard (as the perimeter pixel clusters will not have been traversed).

Moreover, by implementing system and method embodiments according to the present invention, using pixel cluster traversal, it is possible to extrapolate with reasonable confidence that the end user is being facilitated in manipulating their local GUI. In instances like this the server may respond with a more intelligent user interface and on screen assistance.

Embodiments according to the present invention may be used for other purposes. For example, servers may provide additional support, or indeed, different interfaces to those users that are employing assistive devices, or whose perimeter-traversal patterns indicates difficulty in manipulating the cursor. As the perimeter traversal patterns associated with a user are identified, these patterns can be evaluated to determine if they match patterns known from particular assistive accommodations. When a pattern is identified, the server may choose to use the information to provide a different user interface, to provide targeted advertising, to capture different metrics, to provide greater assistance or so on. For example, a financial site may have a mortgage calculator or the like, which requires entries to be made within a time period. Understanding that the user has difficulty may result in the site providing a click to call interface to a help desk.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

That which is claimed is:

1. A method for detecting click fraud comprising:
accessing a web page containing an advertisement;
providing at least one mechanism associated with each pixel cluster of a plurality of pixel clusters on the web page, each mechanism capturing information regarding the transit of the pixel cluster by a cursor on the web page, the captured information providing an indication of click fraud, wherein each pixel cluster of the plurality of pixel clusters is at a discrete location on the web page from each of the other pixel clusters and outside an area of the advertisement; and
collecting information based on the capturing by each mechanism of information regarding the transit of the associated pixel cluster by a cursor on the web page.

2. The method according to claim 1, further comprising providing each pixel cluster on the web page with the advertisement.

3. The method according to claim 1, further comprising verifying the cursor on the web page has transited at least one pixel cluster on the web page prior to a click on the advertisement.

4. The method according to claim 1, further comprising determining a confidence level useable in the determination of click fraud, said confidence level responsive to said collected information based on the capturing by the at least one mechanism of information regarding the transit of the associated pixel cluster by a cursor on the web page.

5. The method according to claim 4, further comprising measuring a speed of the cursor transiting each pixel cluster and factoring the measured speed into the confidence level determination.

6. The method according to claim 4, further comprising displaying an initial presentation of the advertisement for a short time duration in one of a transparent or an invisible font, a click on the advertisement during the short time duration being factored into the confidence level determination.

7. The method according to claim 1, further comprising timing a view duration of the web page.

8. The method according to claim 7, further comprising determining a confidence level responsive to the view duration.

9. The method according to claim 1, further comprising providing the at least one mechanism each time the web page is displayed.

10. The method according to claim 1, further comprising transmitting by the at least one mechanism information captured regarding the transit of the associated pixel cluster to a processing device.

11. The method according to claim 1, further comprising positioning the pixel clusters at least one of along a perimeter around the advertisement on the web page or at various places over the web page.

12. The method according to claim 1, further comprising capturing whether the cursor on the web page has transited at least one pixel cluster by the at least one mechanism associated with the at least one pixel cluster, the mechanism comprising at least one of an applet, an ActiveX control, a plugin, a JavaScript, a browser scripting language, browser extensions, or code native to the browser.

13. The method of claim 1, further comprising detecting click fraud from the captured information, wherein detecting click fraud comprises:
validating that prior to clicking on the advertisement the cursor moved from an initial position on the web page when the web page loaded to the advertisement and transited at least one pixel cluster;

timing a duration of a web page view from the web page being initially loaded to a time of clicking on the advertisement;

determining a confidence measure that a sequence of the web page being initially loaded, transit of the cursor to the advertisement and clicking on the advertisement was in a within a threshold time duration;

adjusting the threshold time duration using a database of surveyed cursor movement data from human users to control a rate of false alarms of click fraud detection;

moving the cursor to a non-default location on the web page in response to the web page loading, wherein the non-default location comprises one of a location from a predefined location list and a pseudo-random generated location and wherein the cursor is required to be moved from the non-default location to the advertisement;

comparing movement of the cursor from the non-default location to human characteristics for the same movement to detect click fraud; and detecting a click on the advertisement when the advertisement is initially displayed in one of a transparent or an invisible font.

14. A device, the device accessing a server hosting a web page containing an advertisement and comprising:

a workstation including a memory;

a network interface in the workstation, the network interface allowing access to the server; and client code, the client code:

displaying the web page with the advertisement;

providing a mechanism associated with each pixel cluster of a plurality of pixel clusters for capturing information regarding the transit of the pixel cluster by a cursor on the web page, the captured information providing an indication of click fraud, wherein each pixel cluster is at a discrete location on the web page from each of the other pixel clusters and outside an area of the advertisement; and collecting information based on the capturing by each mechanism of information regarding the transit of the associated pixel cluster by a cursor on the web page.

15. The device according to claim 14, the client code further providing the pixel clusters on the web page with the advertisement.

16. The device according to claim 14, the client code further verifying the cursor on the web page has transited at least one pixel cluster on the web page prior to clicking the advertisement.

17. The device according to claim 14, the client code further determining a confidence level useable in the determination of click fraud, said confidence level responsive to said collected information based on the capturing by the mechanism of information regarding the transit of the associated pixel cluster by a cursor on the web page.

18. The device according to claim 17, the client code further gathering data related to at least one of: a timing of a view duration of the web page, the transiting, a speed of the cursor transiting each pixel cluster, a click on the advertisement when initially displayed during a short time duration in one of a transparent or an invisible font, or the clicking of the advertisement, each of the gathered data being useable in a determination of a possible click fraud.

19. The device according to claim 17, the client code further displaying an initial presentation of the advertisement for a short time duration in one of a transparent or an invisible font, a click on the advertisement during the short time duration being factored into the confidence level determination.

20. The device according to claim 14, the client code further providing each associated mechanism each time the web page is displayed.

21. The device according to claim 14, the client code further transmitting by each associated mechanism information captured regarding the transit of each pixel cluster to a processing device.

22. The device according to claim 14, the client code further positioning the pixel clusters at least one of along a perimeter around the advertisement on the web page or at various places over the web page.

23. The device according to claim 14, the client code further capturing whether the cursor on the web page has transited the pixel cluster by the mechanism associated with the pixel cluster, the mechanism comprising at least one of an applet, an ActiveX control, a plugin, or a JavaScript, a browser scripting language, a browser extension, or code native to the browser.

* * * * *